Nov. 13, 1962   R. A. CRESSWELL ET AL   3,064,114
APPARATUS AND PROCESS FOR SPRAYING MOLTEN METAL
Filed Sept. 8, 1960
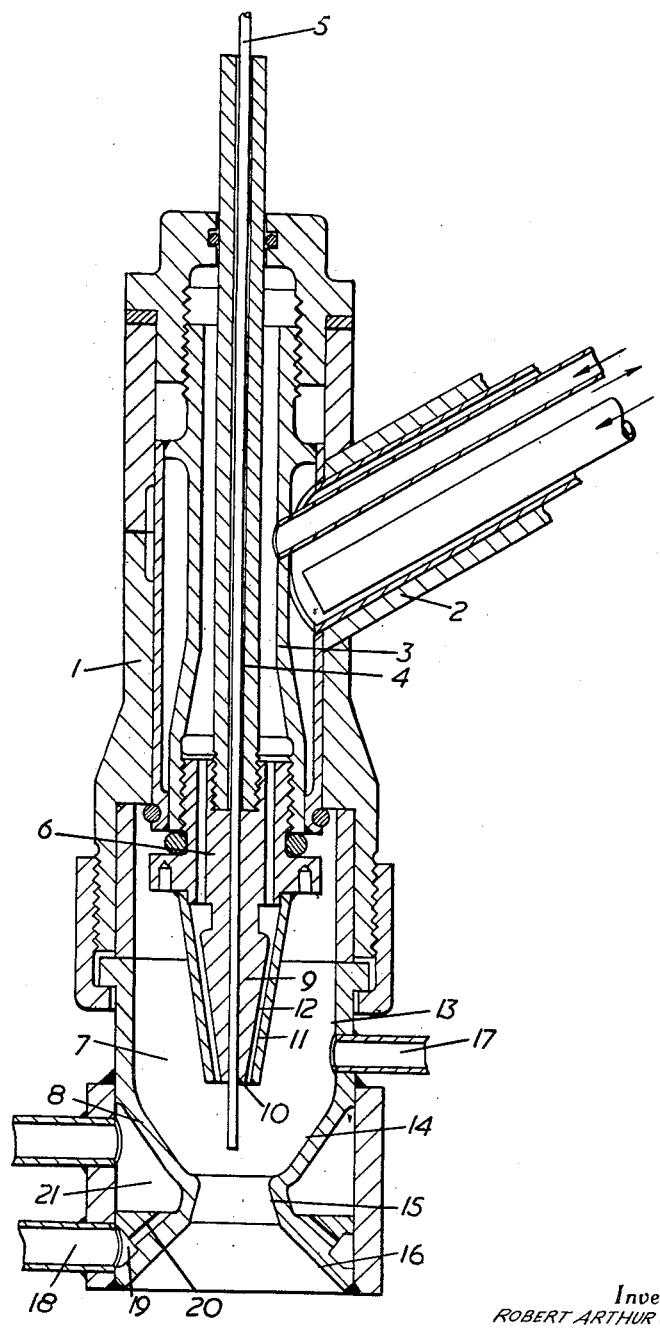
Inventors
ROBERT ARTHUR CRESSWELL
CLIVE ALBERT BURDEN
By Aaron R. Townshend
Attorney

United States Patent Office 3,064,114
Patented Nov. 13, 1962

3,064,114
APPARATUS AND PROCESS FOR SPRAYING MOLTEN METAL
Robert Arthur Cresswell, Surrey, and Clive Albert Burden, Newcastle-on-Tyne, England, assignors to The British Oxygen Company Limited, a British company
Filed Sept. 8, 1960, Ser. No. 54,696
Claims priority, application Great Britain Sept. 14, 1959
11 Claims. (Cl. 219—74)

This invention relates to apparatus, particularly electric arc torches, and processes for spraying molten metal.

At the present time the spraying of metal coatings on articles of metal or other material is largely carried out by melting a wire or metal powder in a spray gun by means of a gas flame, "atomising" the molten metal and propelling the atomised metal from the spray gun by means of a blast of gas. A disadvantage of this process is that metals of high melting point cannot be sprayed in this way owing firstly to the limited heating available when using a gas flame, and secondly to the cooling effect of the blast of gas used to propel the metal from the spray gun.

The objects of the present invention are to provide improved metal spraying apparatus and a process for metal spraying which are suitable for spraying metals having a relatively high melting point.

According to the present invention, a process of metal spraying comprises the steps of progressively feeding a fusible metal electrode into an arc chamber and towards an outlet from the arc chamber defined by a nozzle, establishing an electric arc between the tip of the fusible metal electrode in the arc chamber and the nozzle, feeding gas into the arc chamber where it is expanded by the electric arc and causes a highly heated arc and gas stream carrying metal from the electrode tip to flow through the nozzle, and directing a jet of gas at the electrode tip in the arc chamber to assist in converting the electrode into a stream of fine metal droplets.

All gas fed into the arc chamber may be directed at the electrode tip. An inert gas may be fed to the arc chamber as an annular stream flowing longitudinally of the fusible metal electrode and be directed at the electrode tip. In some cases a reactive gas may also be fed to the arc chamber exteriorly of the annular stream.

Apparatus for metal spraying in accordance with the present invention may comprise an arc chamber, a nozzle defining an outlet from the arc chamber, a wire guide arranged to direct a fusible metal electrode wire into the arc chamber and towards the outlet, electrical connections to the nozzle and to current supply contact means for the electrode wire whereby an electric arc may be established between the electrode wire and the nozzle, means for feeding gas to the arc chamber to cause a highly heated arc and gas stream to flow through the outlet, and means for directing a jet of gas at the tip of the electrode wire within the arc chamber to assist in converting the electrode into a stream of fine metal droplets when the electric arc is established.

The means for directing a jet of gas may comprise a gas-directing nozzle disposed around the wire guide and arranged to direct a convergent jet of gas at the electrode tip. This gas-directing nozzle may be disposed coaxially around the current supply contact means for the electrode wire.

The outlet from the arc chamber defined by the nozzle may diverge at an angle which corresponds approximately to the apex angle of the spray cone of molten metal from the apparatus. This angle may be approximately 30°.

An inlet for feeding material to the arc chamber exteriorly of the gas-directing nozzle may be provided in the arc chamber radially of the gas-directing nozzle.

The nozzle may comprise a frusto-conical wall defining the outlet from the arc chamber, this wall being surrounded by an upper annular chamber for the flow of cooling water in contact with the frusto-conical wall, and this upper annular chamber being connected to a lower annular chamber by a plurality of passages arranged to direct towards the frusto-conical wall cooling water flowing from the lower annular chamber.

An arc torch intended for metal spraying and the process of spraying in accordance with the present invention will now be described by way of example with reference to the accompanying drawing which shows an axial section of this torch.

Referring to the drawing, the arc torch has a cylindrical body 1 mounted on a holder 2 through which shielding gas, electric current and cooling water are supplied. Enclosed within the body 1 is a water cooled liner 3 surrounding a guide tube 4 for electrode wire 5. This guide tube 4 forms part of an electrode guide assembly 6 which is mounted coaxially within the body 1 and arranged to direct electrode wire coaxially into an arc chamber 7 defined within a nozzle 8 mounted on the body 1. The wire directing tip 9 of the electrode guide assembly 6 may be made of a ceramic or other insulating material but is preferably of copper with an external coating 10 of electrical insulating refractory material such as alumina and functions as current supply contact means for the electode. The exterior of this tip 9 tapers towards the outlet end of the arc torch and is surrounded by a gas-directing nozzle 11 which defines with this tip an annular converging passage 12 for directing gas at the electrode wire.

If the wire directing tip 9 is mainly of ceramic or other insulating material it is necessary to provide alternative means for conducting electric current to the electrode wire.

The nozzle 8 is of cylindrical form at 13 where it is mounted on the body 1, has a convergent portion 14 leading to a restricted nozzle outlet 15 from the arc chamber, and an outlet part 16. The spacing of the electrode guide assembly 6 from the restricted nozzle outlet is sufficient to allow an electric arc to be established between the nozzle outlet 15 and the tip of an electrode wire extending beyond the assembly 6. Gas flowing through the arc chamber and out through the nozzle outlet 15 causes the electric arc to be extended through this outlet, which laterally constricts the arc-and-gas stream and produces a stable high temperature plasma jet. To prevent metal droplets from the electrode building up on the wall of the nozzle outlet 15, this wall is frusto-conical so that the outlet is divergent at an angle which corresponds approximately to the apex angle of the spray cone of molten metal spray from the arc torch; a suitable angle is 30°. The walls of the outlet part 16 also diverge but at an angle of approximately 90°.

Shielding gas may be supplied to purge the arc chamber 7 by way of a fluid inlet 17. If desired, during metal spraying, shielding gas may be continuously supplied through this inlet but this will not always be necessary. Gas is supplied continuously through the holder 2, however, and into the converging passage 12 from whence it is directed onto the molten tip of the electrode wire.

During operation, the wire directing tip 9 and the nozzle 8 are connected to a direct current power source, the electrode wire being connected through the wire directing tip 9 preferably to the positive pole of the power source. The nozzle may be connected to the power source by way of one of two cooling water connections 18 to the nozzle 8. Cooling water for the nozzle 8 passes into a lower annular chamber 19, through a plurality of passages 20 directed towards the most highly heated wall of the nozzle 8, i.e. the frusto-conical wall of the outlet 15, and then to waste after flowing around an upper annular chamber 21 one wall of which defines the convergent portion 14 of the nozzle 8 around the outlet from the arc chamber.

In one application of this arc torch, a mild steel plate ⅛ inch thick was sprayed with metal which had been fed to the arc torch as a low carbon, low alloy steel electrode wire. Steel electrode wire (MS65 of 1/16 inch diameter) was fed into the guide tube 4 at a steady speed of 210 inches per minute and, with electrode wire electrically positive, electric current at 320 amperes was supplied to the arc torch at a voltage of 44 volts. Argon gas was supplied to the arc torch at a pressure of 35 lbs./sq. in. and a flow rate of 70–100 cu. ft./hr. to flow through the passage 12, and converge on the molten tip of the electrode wire as this wire was melted by the electric arc established between the wire and the nozzle outlet 15. A spray of molten metal issued from the outlet end of the torch and impinged on a cold surface of the mild steel plate which had been prepared for spraying with the aid of a grinding wheel. The plate was held approximately 4 inches from the arc torch. The deposit was found to be of a very fine texture having good adhesive characteristics. In this particular application the arc torch was operated continuously for 30 minutes, the plate being moved transversely to the arc torch until the surface of the plate had been coated.

In a second application of this arc torch, a stainless steel wire (EN58 of 1/16 inch diameter) was sprayed on to a steel plate of ⅛ inch thickness prepared as above. The electrode was fed into the guide tube 4 at a steady speed of 180 inches per minute, the arc current being 340 amperes at 45 volts. The deposit was of fine and uniform texture and had good adhesive characteristics.

High melting point metals, such as tungsten and molybdenum can be sprayed by use of this arc torch. If desired, powdered material may be fed into the arc chamber through the fluid inlet 17 whence it will flow from the nozzle outlet 15. This method may be chosen to produce a coating of suitably alloy composition, or to produce a cermet composition. Alternatively other modifying substances e.g. reactive gases, may be introduced through this fluid inlet.

We claim:
1. A process of spraying a metal coating on an article comprising the steps of progressively feeding a fusible metal electrode into an arc chamber and towards a restricted outlet from the arc chamber defined by a nozzle, establishing an electric arc between the tip of the fusible metal electrode in the arc chamber and the nozzle, feeding gas into the arc chamber where it is expanded by the electric arc and causes a highly heated arc and gas stream carrying metal from the electrode tip to flow through the nozzle towards the article, and directing a jet of gas at the electrode tip in the arc chamber to assist in converting the electrode into a stream of fine metal droplets.

2. A process as claimed in claim 1, wherein all gas fed into the arc chamber is directed at the electrode tip.

3. A process as claimed in claim 1, wherein an inert gas is fed to the arc chamber as an annular stream flowing longitudinally of the fusible metal electrode and is directed at the electrode tip.

4. A process as claimed in claim 3, wherein a reactive gas is also fed to the arc chamber exteriorly of the annular stream.

5. A process as claimed in claim 1, wherein powdered material is also fed into the arc chamber to flow through the outlet.

6. Apparatus for metal spraying comprising an arc chamber, a nozzle defining a restricted outlet from the arc chamber, a wire guide arranged to direct a fusible metal electrode wire into the arc chamber and towards the outlet, electrical connections to the nozzle and to current supply contact means for the electrode wire whereby an electric arc may be established between the electrode wire and the nozzle, means for feeding gas to the arc chamber to cause a highly heated arc and gas stream to flow through the outlet, and means for directing a jet of gas at the tip of the electrode wire within the arc chamber to assist in converting the electrode into a stream of fine metal droplets when the electric arc is established.

7. Apparatus for metal spraying as claimed in claim 6, wherein the means for directing a jet of gas comprises a gas-directing nozzle disposed around the wire guide and arranged to direct a convergent jet of gas at the electrode tip.

8. Apparatus for metal spraying as claimed in claim 7, wherein the gas-directing nozzle is disposed coaxially around the current supply contact means for the electrode wire.

9. Apparatus for metal spraying as claimed in claim 6, wherein the outlet from the arc chamber defined by the nozzle diverges at an angle which corresponds approximately to the appex angle of the spray cone of molten metal from the apparatus whereby the nozzle constricts the highly heated arc and gas stream without substantial build-up thereon of metal droplets from the electrode wire.

10. Apparatus for metal spraying as claimed in claim 9, wherein the outlet from the arc chamber diverges at an angle of approximately 30°.

11. Apparatus for metal spraying as claimed in claim 7, wherein an inlet for feeding material to the arc chamber exteriorly of the said gas-directing nozzle is provided in the arc chamber radially of the said gas-directing nozzle.

References Cited in the file of this patent

UNITED STATES PATENTS

| | | |
|---|---|---|
| 2,445,177 | Lindblad | July 13, 1948 |
| 2,754,225 | Gfeller | July 10, 1956 |
| 2,847,555 | Yenni | Aug. 12, 1958 |
| 2,868,950 | Gage | Jan. 13, 1959 |
| 2,902,587 | Bernard | Sept. 1, 1959 |
| 2,919,341 | Roth et al. | Dec. 29, 1959 |
| 2,922,023 | Hackman et al. | Jan. 19, 1960 |
| 2,947,847 | Craig | Aug. 2, 1960 |
| 2,966,575 | Libby | Dec. 27, 1960 |
| 2,973,426 | Casey | Feb. 28, 1961 |
| 2,982,845 | Yenni | May 2, 1961 |
| 2,990,466 | Cresswell | June 27, 1961 |